United States Patent Office  3,438,790
Patented Apr. 15, 1969

3,438,790
METHOD AND APPARATUS FOR PACKAGING
Herbert A. Barnby, deceased, late of Toledo, Ohio, by Bernice P. Barnby, executrix, Toledo, Ohio, assignor to Owens-Illinois, Inc., a corporation of Ohio
Continuation-in-part of applications Ser. No. 507,589, and Ser. No. 507,590, Nov. 12, 1965. This application Jan. 21, 1966, Ser. No. 522,330
Int. Cl. A23b *1/00, 7/00*
U.S. Cl. 99—182                    23 Claims This application is a continuation-in-part of my copending applications Ser. No. 507,590, now Patent No. 3,356,510 filed Nov. 12, 1965, and 507,589 now Patent No. 3,332,788, filed Nov. 12, 1965, entitled "Method and Apparatus for Sterile Packaging" and "Sterile Food Packaging Operation," respectively.

In accordance with its broader aspects, the present invention relates to method and apparatus for packaging a flowable liquid-containing product, such as food in containers. In accordance with other even more particular aspects, the present invention pertains to a method and apparatus using a chamber in which to fill a container with various kinds of flowable liquid-containing products and in which to seal the container when so filled by a threaded closure or a lug-type closure while maintaining an elevated gaseous pressure in the chamber.

In accordance with the foregoing aspects, the apparatus of the present invention is such as is also particularly suitable for pressure-tight attachment of a threaded or lug-type closure over the filling opening portion or end of a container, such as a bottle, or jar, or the like, which must be confined in a sterile and/or pressurized environment, all during the attachment of the closure or during both the filling of the container and the attachment of the closure.

In most particular respects, the apparatus of the present invention is particularly adapted for use in packaging various types of liquid-containing products, such as require a sterile and/or pressurized environment during the packaging operation. For example, numerous types of liquid-containing food products ordinarily require confinement within a sterile and/or pressurized environment in order to avoid spoilage, contamination or adulteration of the quality, flavor, appearance or other characteristics of the product. Representative of some such products are such foodstuffs as jellies, jams, preserves, soups, milk, juices and other various types of pre-cooked or partially pre-cooked items, such as stews, puree, hash, corn, diced carrots, peas and the like. Other particularly significant and representative liquid-containing food products requiring such packaging precautions are milk formula and food products prepared for ingestion by infants, specifically baby food formula.

As with my said copending United States patent applications, mentioned above, the present invention from an apparatus aspect has structural components especially designed to process a cooperative interrelationship which enables the apparatus to perform a sequence of operations in rapid cyclic manner within a relatively small work area and in a manner conducive to a low cost commercial operation. At the same time, the apparatus of the present invention is such that the various associated structural components may be cooperatively utilized in an interrelated sequence to insure that the entire packaging operation, including the filling and capping operation, may be carried out in a sterile and/or pressurized environment capable of insuring the packaging of a wholesome food product as well as other various types of flowable liquid-containing products.

Additionally, the present invention, both as it pertains to the sequence of operational steps of the method of the present invention and as it pertains to the structural features of the apparatus of the present invention, is such that it is especially suitable for use with flowable liquid-containing food products, which may be of either the type commonly referred to as "acid-containing" food products, or of the type commonly designated as "non-acid" food products. Typical "non-acid" food products are such comestibles as soups, meats, vegetables, dairy products, and similar products which are characteristically devoid of perceptible or appreciable acidic taste characteristics and generally require the employment of higher processing temperatures than ordinarily are required for the processing of contrasting "acid-containing" food products. For example, "non-acid" food products ordinarily require that the food product be subjected to temperatures in excess of the atmospheric boiling temperature of the liquid fraction in order to achieve the requisite degree of sterilization of the food product, where as "acid-containing food products, such as jams, jellies, preserves, pickles, etc., and the like, ordinarily need not be subjected to temperatures above the atmospheric boiling temperature of the liquid in the product in order to achieve the requisite degree of sterilization. Consequently, it will be appreciated that the apparatus of the present invention, although obviously suitable for use in packaging the more easily sterilized "acid-containing" food products, is especially well-suited for use in packaging "non-acid" types of food products where the additional problems of boiling and evaporation of the liquid is of great importance.

Among the more prominent problems experienced with various types of apparatus heretofore employed has been the problem of providing a filling chamber or head for at least partially filling a container with a flowable product and then hermetically sealing the container which, in addition to being capable of accommodating various operational movements of the container during the filling and sealing, is capable of being pressurized by a pressurizing gas and of being maintained under an elevated gaseous pressure during such movements. Obviously, the requirement for such movements of the container, and particularly while maintaining the chamber and the container under an elevated gaseous pressure, necessitated the employment of a vertically movable sealing or capping device within the filling chamber and extending upwardly through its roof along with elaborate and complex pressure seals capable of accommodating movement of the device without a loss of the elevated pressure within the chamber and the container, especially when the device to seal or the device to apply a partialy threaded closure e.g., a lug cap, or a continuously threaded closure, must also provide rotation about a vertical axis. Alternatively, vertical movement of the chamber with the container would be required and this creates problems of adequate pressure-tight sealing at the passage through which extend a sealing device, especially a rotating one, and a conduit for introducing flowable product to be packaged. As the result of the complexity of the apparatus which has heretofore been necessitated, there has remained a great need for improvement of the overall efficiency and economy of packaging operations employing such apparatus.

Such improvement is extant with the apparatus of the present invention which is adapted to function in such manner that the entire packaging operation, including such operational steps as purging of the chamber, pressurization of the chamber, introduction of flowable liquid-containing product into the container, and even capping of the filled container with a threaded screw-type or lug-type closure, may be rapidly carried out while the container, or at least the filling opening portion thereof, remains confined in sealed pressure-tight communication with the interior environs of the chamber. Additionally, by virtue of the structure and cooperative interrelationship of the structural components of the apparatus of the present invention, the pressure supply means and the product supply means may be retained in immovable or fixed relationship with the chamber and opened and closed by simple control means located within the sterile confines of the chamber. As a consequence, the numerous timing and indexing mechanisms ordinarily required for imparting relative motion between the pressure chamber, pressure supply means and product supply means are avoided. Likewise, operational malfunctions which attend the use of such timing and indexing mechanisms are obviated.

In addition to the foregoing advantages which, of course, are indicative of certain particularly salient objectives, numerous other signficant advantages and objectives are obtainable with the present invention.

Among other objectives and attendant advantages of the present invention is that of providing apparatus for packaging a flowable liquid-containing product and wherein the apparatus is characterized by the inclusion of means defining a chamber having an access opening in which to receive at least a filling opening portion of a container, and wherein control means disposed within the chamber confines is operative to control the discharge of flowable product into a container received in the access opening.

Another objective of the present invention is the provision of apparatus having the characteristics just described and which is further characterized by the provision of means for pressurizing the chamber which are also operatively controllable by the control means.

Another objective of the present invention is the provision of apparatus such as that just described which is also capable of providing a sterile environment within the chamber during the discharge of product into the container.

Another objective of the present invention is the provision of apparatus comprising the combination of means defining a chamber having an access opening in which to receive at least the filling opening portion of a container while the container is being filled with flowable liquid-containing product with means for sterlizing the chamber and for directing a pressurized sterilizing medium directly into the filling opening portion of the container received in the access opening.

Another objective of the present invention is the provision of means defining a chamber in which to fill a container with flowable liquid-containing product and in which to also receive, sterilize and apply a closure, or cap, over the filling opening portion of a container received in the chamber.

Another objective of the present invention is the provision of means for applying a screw-type or lug-type cap, or closure, over the filling opening portion of a container while the interior of the container and the filling chamber remain in pressurized intercommunicating relationship.

A further objective of the present invention is the provision of means defining a chamber in which to fill a container with a flowable liquid-containing product, and in which the chamber defining means contains separate pressure discharge passages leading respectively into preselected upper and lower regions of the chamber.

A further objective of the present invention is the provision of pressure distribution means operably disposed within the chamber for selectively distributing a pressurizing medium to one or the other of the last-mentioned pressure discharge passages.

A further objective of the present invention is the provision of means defining a pressurizable filling chamber having an access opening in which to receive at least the filling opening portion of a container, in combination with inflatable sealing means disposed within the access opening and adapted to contact a continuous peripheral wall segment of the container in pressure-tight sealed relationship and to accommodate axial movement of the container within the access opening while maintaining such pressure-tight sealed relationship with the container.

A still further objective of the present invention is the provision of apparatus operable in conjunction with a pressurizable container filling chamber in such manner as to permit a container located within the chamber to be filled with a hot, flowable, liquid-containing product, such as a liquid-containing food product, while the product temperature exceeds the product's atmospheric boiling temperature, and in such further manner as to accomplish such filling as well as subsequent pressure-tight capping of the container while the container is confined within the filling chamber under sterile pressurized conditions which preclude boiling, contamination or adulteration of the wholesome qualities of the product.

Other objects and advantages of the apparatus and interrelated component parts thereof, such as relate to arrangement, manner of operation and function, construction, combination of parts, the several parts per se, economies of manufacture and other features, will readily become apparent to those skilled in the art from the following detailed description taken in conjunction with the annexed five sheets of drawings, on which:

Figure 1:
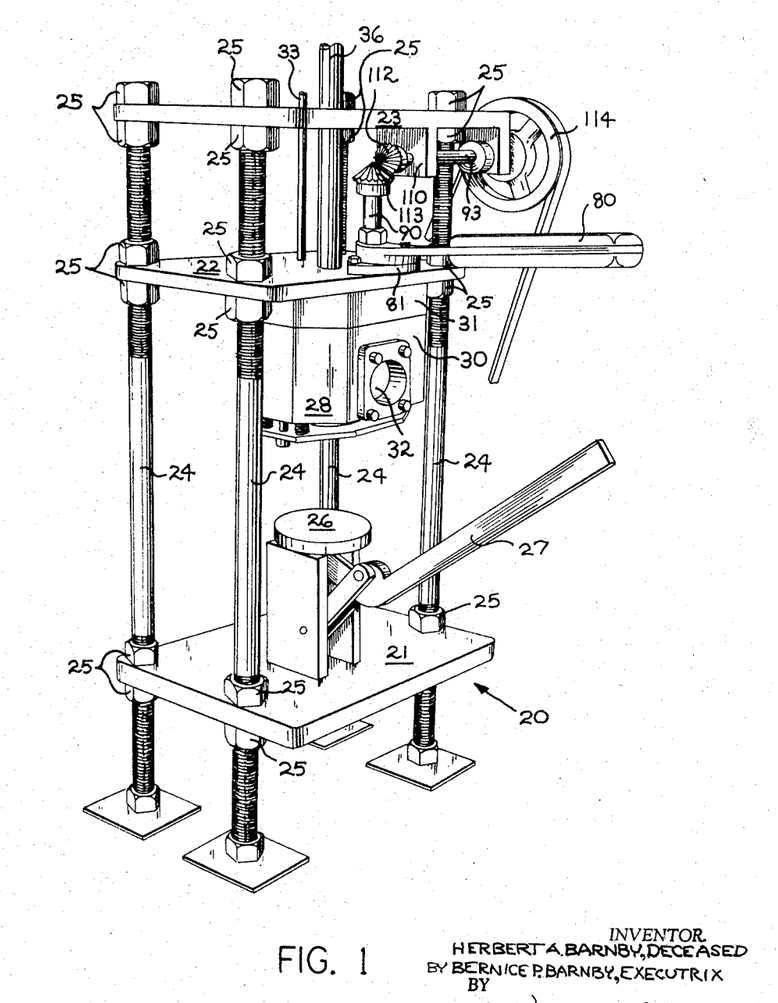
FIG. 1 represents a perspective elevational view of a machine embodying a preferred form of the apparatus of the present invention.
Figure 2:
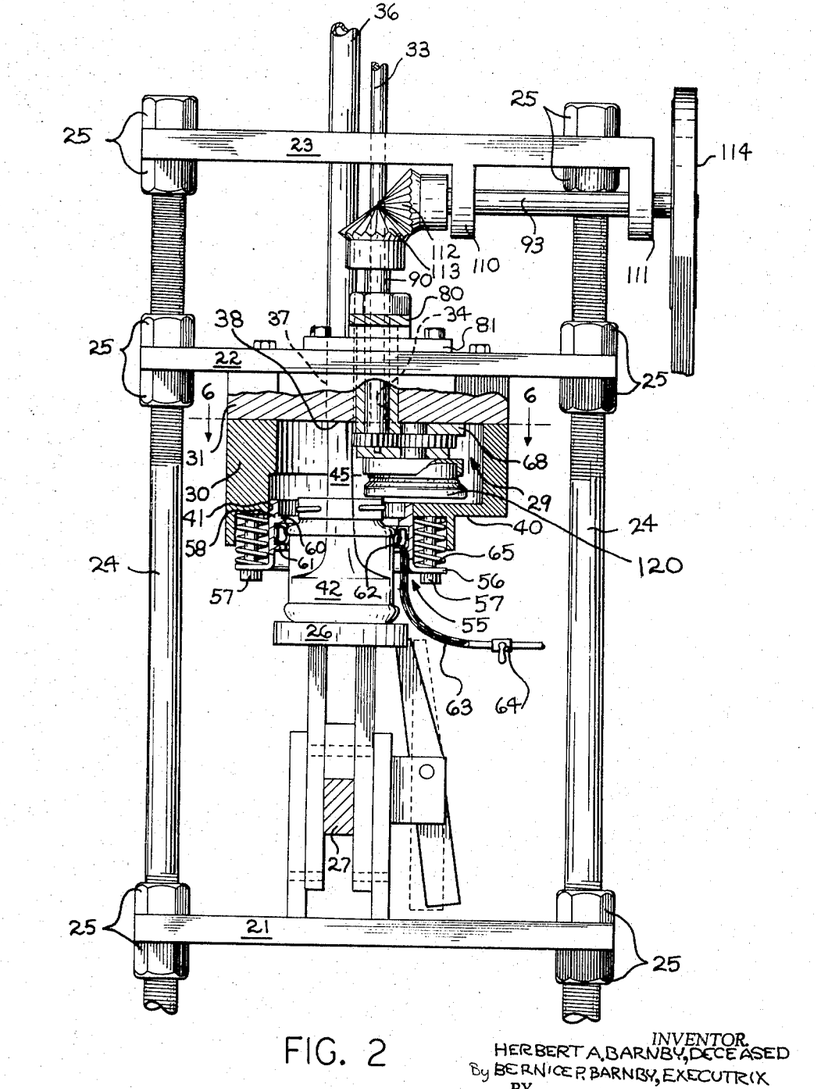
FIG. 2 is a front elevational view of the machine shown in FIG. 1, with a portion of the machine being represented in section to better depict the filling chamber and certain associated apparatus in a functional relationship during an operative phase in which a container is being filled with product.

The overall organization and general orientation of the apparatus in which a preferred embodiment of the present invention is set forth is best shown in FIGS. 1 and 2. As illustrated, the apparatus and various structural components are shown embodied in a manually operable machine suitably arranged and retained in cooperative interrelationship on a stable frame structure which is represented in a general manner by the reference numeral 20. The frame structure 20 comprises a series of three horizontally disposed platforms, or bed plates, 21, 22 and 23 slidably journaled upon a plurality of upright threaded legs or rods 24 and held in vertically stacked and interspaced positions on the rods 24 by adjustment nuts 25 threadably carried on the rods 24, which, of course, also provide a means of vertical adjustment of the bed plates.

Seated on the lower bed plate 21 are means for supporting and delivering a container to the filling and capping chamber. Such means may, as illustrated, comprise a vertically shiftable pedestal 26 which is adapted to be raised and lowered in response to elevating and descending movements of a pivotally interconnected and manually operable elevating arm 27. As with the apparatus described in my aforementioned co-pending applications, the pedestal may, of course, be adapted for automated movements and synchronized to operate in timed relationship with the operation of the other apparatus hereinafter described.

Removably secured to the underside of the bed plate 22 in overhead alignment with the container supporting means, there is means defining a chamber, which is characterized as a hollow pressurizable filling head 28. As best illustrated in FIG. 2, the filling head defines an interior chamber 29 within which the container filling and capping operation is enabled to be carried out in a sterile and pressurized environment. The filling head 28, although susceptible of being constructed as a unitary member, is preferably constructed with a hollow body portion 30 having an open upper end enclosed by a head plate 31, which is preferably bolted or otherwise removably secured to the body portion in pressure-tight relationship. The separable construction, of course, permits the head plate 31 to be removed to facilitate entry into the chamber for purposes of maintenance, repair, adjustment and cleaning of certain operative parts of the apparatus, which, as will be subsequently described, are located within the chamber confines. For viewing purposes, a side viewing opening covered by a pressure-tight transparent inspection plate 32 may be optionally provided in the wall of the body portion 30.

Sterilization and pressurization of the chamber is accomplished by means of a sterile pressurizing medium, such as steam, or other suitable gaseous or vaporescent substances, capable of similarly imparting or providing a sterile and pressurized environment within the chamber 29. The sterile pressurizing medium is carried through a pressure supply conduit 33 running from a suitable supply source, not shown, to a chamber pressurizing passage 34, best observed in FIGS. 7–15, extending through the head plate 31 to a pressure discharge outlet 35 emptying into the chamber 29. In similar manner, flowable liquid-containing product, which, for example, might be a hot "non-acid" food product selected from one of the types previously mentioned, is carried through a product supply conduit 36 leading from a suitable product supply source, such as a conventional pressurized food cooker, of sterilizer, or the like, not illustrated. The product supply conduit 36 leads to the inlet opening of a product supply passage 37, which, like the pressurizing passage 34, extends through the head plate 31 to a discharge outlet 38 emptying into the chamber 29.

At the opposite or lower end of the body portion 30, the chamber walls are shaped to converge radially inward and form a generally flat annulated bottom wall 40 having an eccentrically located transverse wall opening forming an access opening at 41. As illustrated, the access opening 41 is offset from the center of the bottom wall 40 and is located in spaced axial alignment with the discharge outlet 38 of the product supply passage 37. As will subsequently be more thoroughly understood, the access opening 41 provides a passageway through which the chamber 29 is rendered accessible to a container, such as the container 42, whereby product 43 may be introduced into the filling opening portion 44 of the container 42 within the confines of the chamber, i.e., into the open end or open mouth 44 of the top part of container 42.

Figures 7, 8, 9, 10:
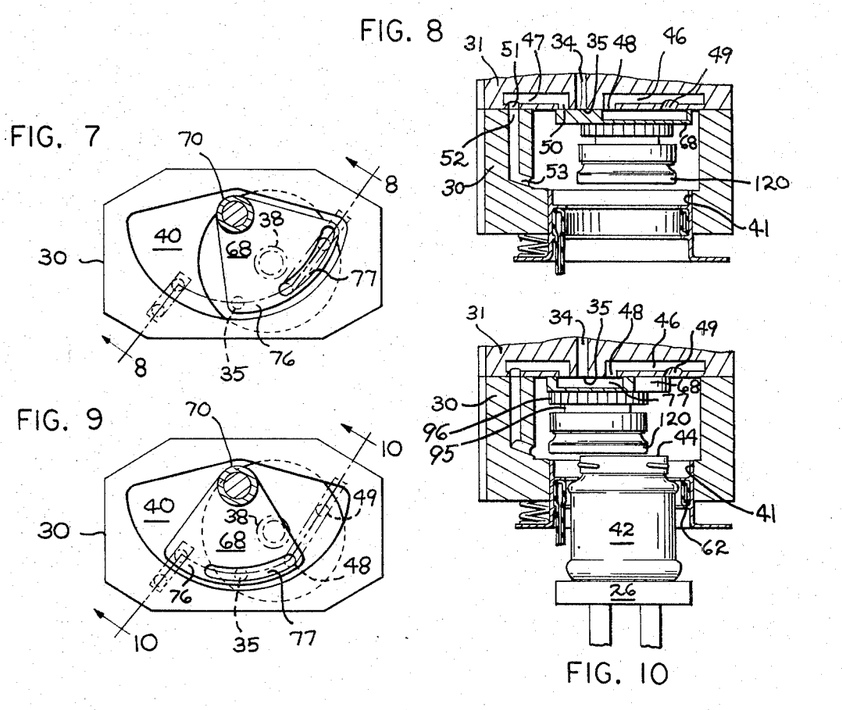
FIG. 7 is a view similar to FIG. 6, but, for purpose of clarity and comparison, shows the position selected as being representative of the control means position at the commencement of one complete cycle of operation of the apparatus.
FIG. 8 is a sectionalized fragmentary elevational view taken along and in the direction of the sectional plane 8—8 in FIG. 7, depicting the cooperative interrelationship of the container filling and capping chamber and its associated apparatus when the control means is located in the control position shown in FIG. 7.
FIG. 9 is a view comparative to FIG. 7, but, by contrast, depicting the control means advanced to a second representative control position.
FIG. 10 is a sectionalized fragmentary elevational view taken along and in the direction of the sectional plane 10—10 in FIG. 9, depicting the cooperative interrelationship of the container filling and capping chamber and its associated apparatus when the control means is located in the control position shown in FIG. 9.

Within the walls of the chamber defining means, or filling head, 28, separate pressure discharge passages are provided through which the sterile pressurizing medium emanating from the pressure discharge outlet 35 may be distributed, in a manner to be subsequently described, to different regions of the chamber 29. As illustrated in FIG. 8, at least a pair of such discharge passages designated as 46 and 47 are defined in the head plate 31 and run laterally between the exterior and interior wall surfaces thereof. One of such discharge passages, such as 46, leads between a pair of terminal openings, such as inlet opening at 48 and a discharge opening or outlet at 49, both of which open into and communicate with the upper region of the chamber 29, whereas the other of such discharge passages, such as 47, leads between an inlet opening 50 communicating with an upper region of the chamber 29 and a transfer opening 51 registering with a passageway 52 leading downwardly within the side wall of the body portion 30 to a discharge outlet 53 communicating with a lower region of the chamber 29. Directionalization of the sterile pressurizing medium in the chamber is further accomplished by the orientation of both of the discharge outlets 49 and 53 in a direction disposed obliquely downward towards the access opening 41.

Sealing means, shown generally as 55 in FIG. 2, slide within the access opening 41 and are adapted to provide a pressure-tight seal beween the container 42 and the surrounding wall portion of the access opening 41 so that the chamber 29 and the container filling opening portion 44 may be sealed in intercommunicating pressurized relationship during the container filling and capping operation. Included as a part of the sealing means 55, there is an annular carrier which comprises an annular base plate 56 slidably supported on carrier bolts 57 depending from and secured to the underside of the filling head 28. Rising from the base plate 56, there is an annular collar 58 which is slidably received within the access opening for sliding axial movements, or telescoping movements, between alternative outer (FIG. 2) and inner (FIG. 15) locations within the access opening 41; the peripheral configuration of the annular collar 58 being such as to maintain substantially pressure-tight contact or hermetically sealing relationship with the walls of the access opening 41 during such movement to prevent loss of elevated gaseous pressure to the atmosphere by passage of gas, such as steam, between the collar 58 and the access opening 41. Preferably, conventional sealing rings (not shown) are mounted on one or both of the outer surface of the annular collar or hollow piston 58 or on the opposing surface of the cylindrical (or other configuration matching that of the hollow piston 58) wall of the bottom extension of the filling head 28 that is called herein the access opening 41 of the chamber 29. Within the annular collar 58, a pair of concentric, axially spaced and inwardly projecting internal ribs 60 and 61 cooperate to define an interior circumferential channel in which, as an additional part of the sealing means 55, there is carried an inflatable annular sealing ring 62 having a hollow tubular body portion fabricated from a resilient expansible material such as rubber or a material having similar rubber-like characteristics. The hollow interior of the sealing ring 62 is connected to a connector tube 63 connected to a 3-way valve 64 which in one position communicates with a suitable-pressure source, not shown, by means of which the sealing ring may be inflated and expanded into pressure-tight sealing contact with a continuous circumferential, or peripheral, wall segment of the container 42 when the filling opening portion 44 thereof is received within the access opening 41. Conversely, the sealing contact may be disrupted by turning the 3-way valve 64 to a position exhausting the connector tube 63 to the atmosphere and thereby deflating the sealing ring 62.

Resilient means 65 carried between the sealing means 55 and the underside of the chamber defining means 28 function to urge the annular collar 58 together with the sealing ring 62 towards the aforementioned outer alternative location within the access opening 41. Such resilient means, although being capable of variable construction, are typified herein in a preferable form as resilient coil springs, or the like, which are coiled on the stem portion of each of the carrier bolts 57 and interposed between the filling head 28 and the base plate 56. As shown in FIG. 8, among others, the resilient means 65 function to urge the sealing means 55 outwardly so as to bias the base plate 56 against the enlarged head portion of the carrier bolts 57, whereat the sealing ring 62 is correspondingly positioned in its outer alternative location with respect to the access opening 41.

Means for programming and coordinating the operation of the apparatus, including such sequential operational phases as the purging of the chamber, the pressurizing and sterilizing of the interior of the container and the chamber, the filling of the container with food product, and the delivery and pressure-tight atachment of a closure, or cap, over the filling opening portion of the filled container, are also provided and comprise shiftable control means located within the chamber 29 for controlling the filling and pressurizing operations, actuator means for imparting shifting movements to the control means, orienting or positioning means for intercoordinating the movement of the actuating means with various alternative control means positions within the chamber, and capping means for the delivery and pressure-tight attachment of a closure, or cap, over the filling opening portion of the filled container.

Figures 3, 4, 5, 6:
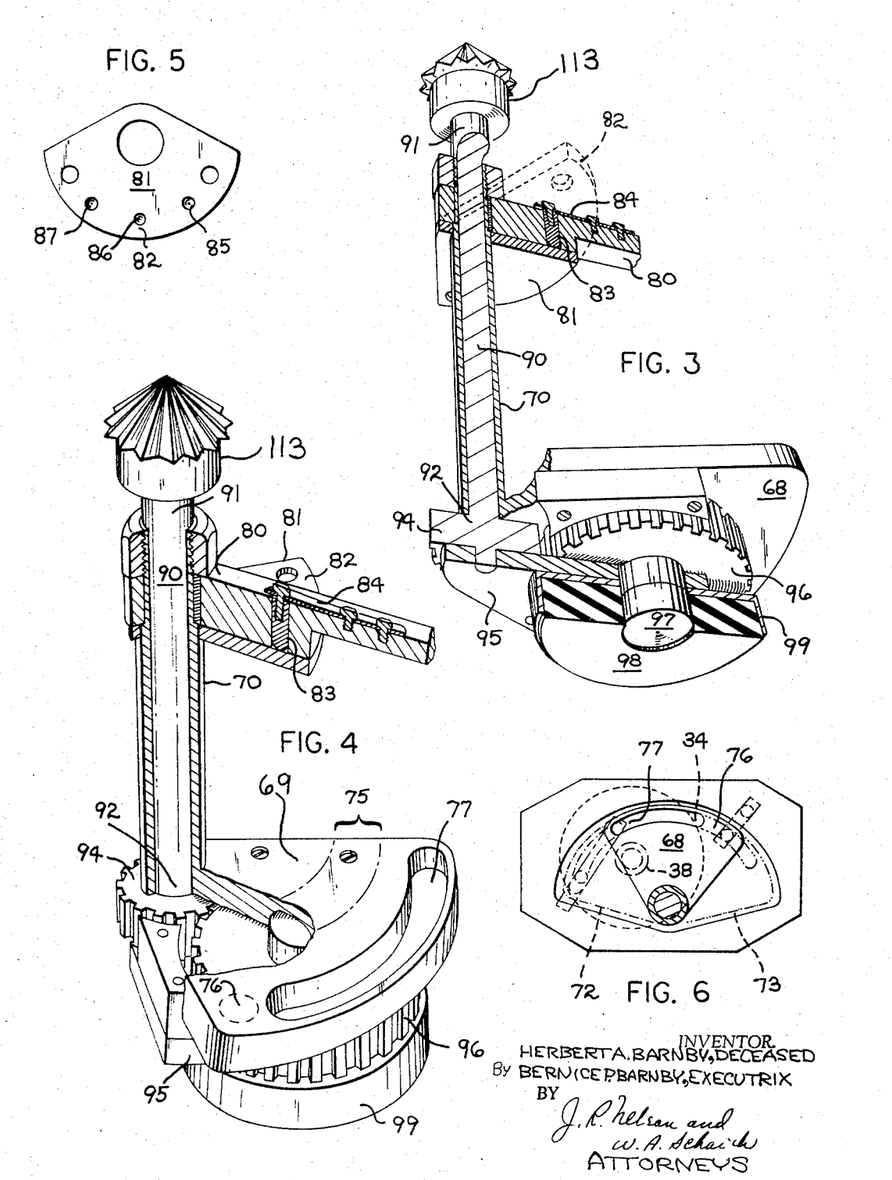
FIG. 3 is a partially sectionalized perspective view of the means for sequencing, controlling and regulating various operative phases of the associated apparatus of the present invention.
FIG. 4 is another partially sectionalized perspective view of the means depicted in FIG. 3, and illustrating additional structural features thereof.
FIG. 5 is a plan view of means for relating or orienting the means depicted in FIGS. 3 and 4 with other operative parts and sequence phases of the apparatus.
FIG. 6 is a planar sectional view taken along and in the direction of the sectional reference plane 6—6 indicated in FIG. 2, and which, by means of contrasting continuous and broken lines, depicts various alternative control positions of the means for controlling the filling, pressurizing, and/or sterilizing, and capping of a container within the chamber.
Figure 12:
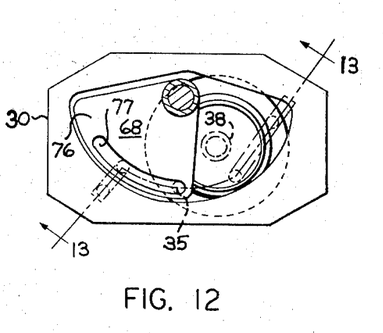
FIG. 12 is a view depicting the control means advanced to a third representative control position at which the next succeeding operational phases of the product packaging operation may be carried out.

The control means includes a transfer plate or control plate 68 disposed within the chamber 29 and having an upperside 69 arranged in mating or abutting relationship with the underside surface of the head plate 31. Integral with and rising from one end of the control plate, there is an axially elongated tubular sleeve 70 which is journaled through ad oscillatable within a bore provided in the head plate 31. As best shown in FIGS. 3 and 4, the control plate 68 defines a peripheral configuration generally corresponding in shape to a triangulated radial segment of a circular plate and converges radially towards and merges integrally into the lower end of the tubular wall of the sleeve 70. Thus, oscillation of the sleeve 70 about its longitudinal axis imparts a corresponding pivotal movement to that control plate 58 about that longitudinal axis of the sleeve 70. As a consequence, the control plate 68 is enabled to be oscillated or pivotally shifted within the chamber 29 between various alternative operative positions mating or seating against the underside of the head plate 31. The relative alternative positioning, or control positions, of the control plate 68 is best depicted in FIG. 6 wherein the control plate is shown in solid lines in one of its alternative positions and in broken lines, as at 72 and 73, in other of its respective alternative positions. Additionally, each of the representative alternative positions shown in FIG. 6 are further amplified by being individually depicted in FIGS. 7, 9 and 12. For example, FIG. 7 shows the control plate 68 located in the position corresponding to that designated at 72 in FIG. 6, and FIG. 9 shows the control plate in the position corresponding to that indicated by solid lines in FIG. 6, and FIG.12 shows the control plate in the position corresponding to the position designated at 73 in FIG. 6.

Referring particularly to FIG. 4, it will be observed that the upperside 69 of the control plate 68, or, as otherwise stated, that side of the control plate which slidably mates or seats against the underside of the head plate 31, defines a smooth arcuate surface segment, as at 75, which functions as a valve or seat which travels in an arcuate or pivotal path crossing over and blocking the discharge outlet 38 of the product supply passage 37 when the control plate is at the control positions shown in FIGS. 7 and 9 and when the control plate 68 is shifted between these alternative control positions. Additionally, the upperside of the control plate 68 is provided with an outer arcuate marginal segment arranged to travel in an arcuate or pivotal path crossing over the pressure discharge outlet 35 and over the inlet openings 48 and 50 of the separate respective discharge passages 46 and 47 during pivotal movements of the control plate between alternative control positions thereof. Included in that upperside part of the control plate 68 designated as the outer marginal segment, there are means for both closing or blocking the pressure discharge outlet 35 and for selectively distributing the sterile pressurizing medium therefrom to the inlet openings 48 and 50 of the separate discharge passages 46 and 47, respectively. The means for closing the pressure discharge outlet takes the form of a smooth arcuate surface segment, as at 76, which functions as a valve or seat adapted to seat against and block the pressure discharge outlet 35 when the control plate 68 is in the alternative control position indicated in FIG. 7. On the other hand, the means for selectively distributing the sterile pressurizing medium takes the form of an arcuate groove or channel at 77. When the control plate is in the alternative control position indicated in FIG. 9, the channel at 77 spans and provides selective intercommunication between the pressure discharge outlet 35 and the inlet opening 48. However, when the control plate is shifted to the alternative control position indicated in FIG. 12, the channel at 77 spans and provides selective intercommunication between the pressure discharge outlet 35 and the inlet opening 50.

The actuator means and the orienting or positioning means, being closely interrelated, will be described together in the manner in which they cooperate to actuate and to orient the control means. In keeping with such description, it will be observed that an actuating or positioning arm 80 is carried on and extends laterally outward from the sleeve 70. The arm 80 is keyed or otherwise interconnected with the sleeve 70 so as to impart oscillatory motion to the sleeve when swinging movements are imparted to the arm so as to cause the arm to reciprocate in opposite directions about the central axis of the sleeve. Bolted or otherwise stationarily secured to the upperside of the bed plate 22 and forming a supporting collar for the sleeve 70, there is a positioning plate 81 which is located directly beneath the arm 80 and provides a riding surface 82 upon which the arm may ride during its swinging movement. Carried on the arm 80 and moving therewith across the riding surface 82, there is a detent pin 83 which runs vertically through the arm and is biased downward against the riding surface 82 by the action of a resilient leaf spring 84 affixed to the upperside of the arm. For use in conjunction with the detent pin 83, there is provided on the riding surface 82 a plurality of spaced detents, or recesses, as at 85, 86 and 87, which are located in an arcuate path coinciding with the path of travel of the detent pin 83 across the riding surface and which are adapted to receive and grasp the projecting end of the detent pin 83 and thereby impede free travel of the arm 80 across the riding surface, at least to the extent of the biasing influence of the leaf spring 84. The detent locations at 85, 86 and 87 furthermore are selectively located to orient the arm 80 and sleeve 70 in positions which register or index the interconnected control plate 68 in positions corresponding to the alternative control positions shown in FIGS. 7, 9 and 12.

Loosely sleeved for independent axial rotation within the sleeve 70, there is a driven shaft 90 which has opposite end portions extending axially outward from the sleeve 70, as at 91 and 92; the latter of which extends into the open confines of the chamber 29. Rotation of the driven shaft 90 is derived through its end portion 91 which is geared to a driving shaft 93 and ancillary driving mechanism. The rotational motion so derived is transmitted by the shaft 90 through a driving spur gear 94 located within the chamber and journaled on the shaft end portion 92. As best illustrated in FIGS. 3 and 4, a retaining plate 95 is secured in spaced parallel relationship with and from the underside of the control plate 68 so as to shift together with the control plate as the latter is shifted between its respective alternative control positions within the chamber 29. Supported by and between the retaining plate 95 and the control plate 68 and adapted to travel therewith to and between the alternative control positions of the control plate, there is a second gear designated as a driven spur gear 96 which is peripherally entrained with the teeth of the driving spur gear 94 and which is free to rotate independently of either the retaining plate 95 or the control plate 68.

The means for delivering and attaching a closure, or cap, to a container, such as the container 42, comprises a magnetic cap holder 97 and a friction drive unit encircling the cap holder 97, both of which are located beneath the retaining plate 95 and are carried and are rotatable with the driven spur gear 96. The magnetic cap holder 97 is preferably fabricated from a magnetizable hardened steel or steel alloy capable of possessing sufficient magnetic attraction to overcome and hold the weight of a conventional magnetizable metallic container cap or closure. The friction drive unit preferably comprises an annular central portion 98 fabricated from a flexible and resilient material having a high coefficient of friction, such as soft rubber or a similar rubber-like material, and is peripherally confined within and secured to rotate with an annular housing or driving ring 99 which in turn is secured or otherwise interconnected for rotation with the driven spur gear 96. In order that the cap or closure may be pressed against and compress the resilient central portion 98, the magnetic cap holder 97 is recessed slightly within the resilient material.

The rotational movement transmitted to the driven shaft 90 by the driving shaft 93 may be continuous or, if preferred, the rotation may be intermittent. In the latter instance, the rotation need only be effected when the control plate is shifted from the control position shown in FIG. 12 to the control position shown in FIG. 7. Ancillary driving mechanism suitable for imparting rotational movement to the shaft is shown in FIGS. 1 and 2 and comprises, together with the driving shaft 93 which is supported under the bed plate 23 by spacers 110 and 111, a miter gear 112 carried on one end of the driving shaft 93 integrated with a mating miter gear 113 carried on the end portion 92 of the shaft 90, and a belt driven pulley 114 on the opposite end of the driving shaft 93, which may be continuously or intermittently operated by conventional power means, not shown.

As a consequence of the structure and structural interrelationships herein described, the apparatus is operable in such manner that the capping means, although being freely and independently rotatable relative to the control means, is shifted together with the control means as the latter is transferred to and between each of its respective alternative control positions. Keeping such operational and structural features in mind, the programming and sequencing of the apparatus will now be described in accordance with the sequence of operations shown in FIGS. 7–15, inclusive. Recognizing that the sequences shown are merely representative of one complete cycle of operation and that the operation may be carried out in a generally continuous, or semi-continuous, and repetitive manner, reference will first be made to FIG. 7 where, as shown, the control plate 68 is depicted as being indexed to a control position in which the control plate is disposed in overlying axial alignment with the chamber access opening 41. In such position, which for purposes of reference may be considered as a first alternative control position, the positioning arm 80 will occupy a location on the riding surface 82 of the positioning plate 81 (FIGS. 3 and 4) such that the detent pin 83 projects into and is registered with the positioning plate detent or recess at 85 (FIG. 5). The correlative positioning of the cap holder 97 and the control plate 68 within the chamber 29, which corresponds to the control plate position shown in FIG. 7, is illustrated in FIG. 8. By correlation, when the control plate 68 is in the position shown in FIG. 7, it will be observed in FIG. 8 that the pressure discharge outlet 35 leading from the pressurizing passage 34 is closed to the interior confines of the chamber 29 by the marginal upperside surface segment at 76 of the control plate which seats against the discharge outlet 35 and closes the same. Also, at this first alternative control position, the friction drive member 98 and magnetic cap holder 97 are registered in spaced axial alignment with the chamber access opening 41 and are readily accessible for receiving a closure, or cap, 120; the closure being placed with its crown centered against the friction drive member and held by the magnetic attraction of the magnetic cap holder 97 which, although recessed within the friction drive member and slightly spaced from the surface of the cap or closure, exerts sufficient magnetic attraction to hold the closure in position.

Figure 11:
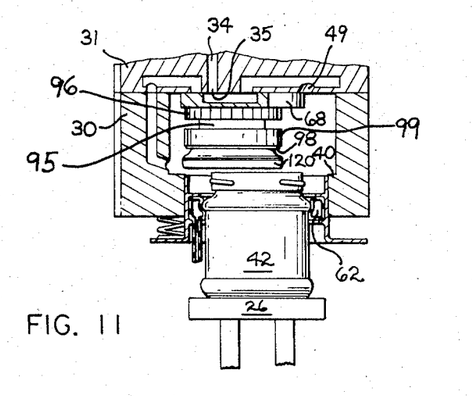
FIG. 11 is a view similar to FIG. 10, but showing the sealing means within the container access opening after being expanded into sealed pressure-tight peripheral contact with a wall segment of the container.

As the next succeeding sequence, the positioning arm 80 is indexed to the detent at 86 (shown in FIG. 5) on the positioning plate 81, whereby the control plate 68 is correspondingly indexed to the control position shown in FIGS. 9 and 10. At this control position, which may be referred to as the second alternative control position, the shiftable pedestal 26 with a container 42 seated thereon is raised by the exertion of downward force upon the manual elevating arm 27, and brought into centered alignment within the container access opening 41 and into position with a peripheral wall segment of the container situated in narrowly spaced adjacent relationship with the inflatable sealing ring 62 which, as will be observed, has not as yet been inflated. As a consequence, an annular space or opening leading between the interior confines of the chamber 29 and the ambient exterior atmospheric conditions is provided between the wall of the container and the deflated sealing ring. It will also be observed that the control plate in such position selectively registers the arcuate pressure distribution channel 77 with the discharge outlet 35 of the pressurizing passage 34 and with the inlet opening 48 of the discharge passage 46 so as to direct the sterile pressure supply medium, such as steam, into the discharge passage 46, and thence into the interior confines of the chamber through the discharge outlet at 49 which is aligned to direct the emergent sterile pressure supply medium obliquely downward into the upper region of the chamber and towards the access opening 41 in which the filling opening portion 44 of the the container is located. As a consequence, the pressure supply medium, upon emerging into the chamber, surges downward into the filling opening portion 44 of the container 42 under sufficient force to purge air and other contaminants from the interior of the container and the chamber and dispel the same out through the annular opening between the wall of the container and the deflated sealing means. Following momentary purging of the interior confines of the chamber and container, the sealing ring 62 is inflated, as shown in FIG. 11, and caused to distend or expand radially into pressure-tight sealing contact with a continuous peripheral wall segment of the container 42. As a consequence of this sealing contact and the continued emergence of sterile pressurized supply medium from the discharge outlet 49, the sterile pressurized medium is trapped within the chamber, and the chamber and the interior of the container become pressurized.

Figure 13:
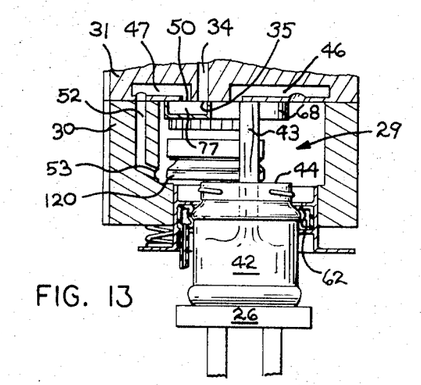
FIG. 13 is a fragmentary sectional elevational view of the chamber and its associated apparatus as viewed along and in the direction of the sectional plane 13—13 in FIG. 12.

Following pressurization of the chamber and the container, the control plate 68 is indexed to the control position indicated in FIG. 12 by movement of the positioning arm 80 to a position whereat the detent pin 83 seats in the detent located at 87 on the positioning plate 81. In this latter position, which may be referred to as a third alternative control position, the control plate 68, as best observed in FIG. 13, is correspondingly indexed to a location or control position in which unobstructed flow of flowable liquid-containing product issuing from the product supply outlet at 38 may be received through the container filling opening portion 44 into the interior of the container 42. Also, at this control position, the pressure distribution channel 77 is caused to selectively register with the pressure discharge outlet 35 and with the inlet opening 50 of the discharge passage 47 which in turn communicates with the passage 52 in the wall of the chamber bottom portion 30 so that the sterile pressure supply medium is discharged from the discharge outlet 53 of the latter passage into the lower region of the chamber 29. The directional alignment of the discharge outlet 53 with respect to the access opening 41 also directs the sterile pressurized medium so that it impinges upon the rim of the closure 120 and travels into and across the filling opening portion 44 of the container 42. At the same time, as will be observed, the sealing ring 62 is still inflated and continues to remain in pressure-tight peripheral contact with the wall of the container. As a result, the container 42 and chamber 29 both remain in an intercommunicating pressurized condition during and after the filling of the container with product.

Figures 14, 15:
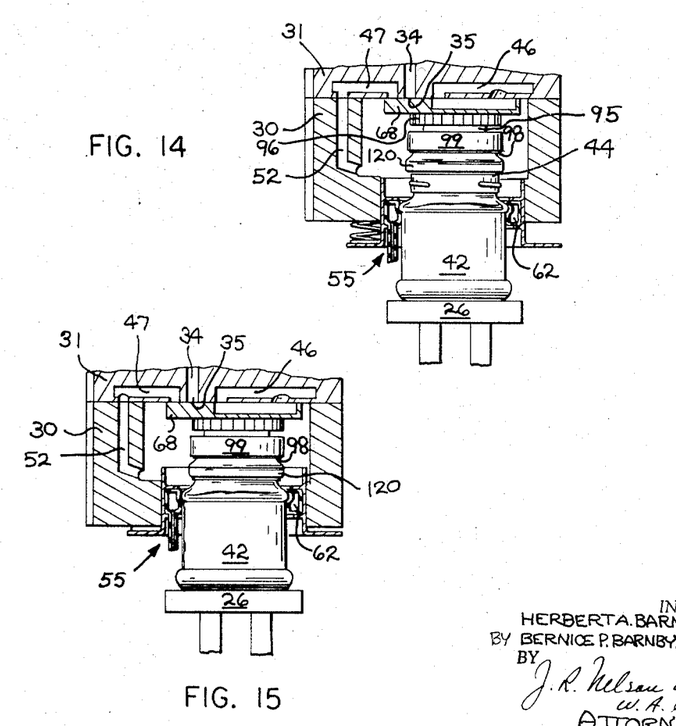
FIG. 14 depicts the control means returned to the initial control position shown in FIGS. 7 and 8, but, by contrast, showing the filled container in readiness to receive a threaded closure or cap.
FIG. 15 is a view similar to FIG. 14, but depicting the container elevated into threaded engagement with the closure or cap while the control means remains in the control position shown in FIG. 14.

When the desired quantity of fluid product has been discharged into the container, the control plate 68 is then indexed to return to the first alternative control position previously indicated in FIG. 7, but, as shown in FIG. 14, with the sealing ring 62 being retained in sealing contact with the container 42 so as to preclude depressurization of the chamber and the food product within the container. At this control position, the entry of the pressure supply medium is concluded since the discharge outlet 35 through which the pressure supply medium enters the chamber is closed by the control plate.

Very quickly after the control plate is returned to the first alternative control position, the pedestal 26 is further elevated by the impartation of additional downward force upon the elevating arm 27. Attendant with the elevation of the pedestal, the container 42 is concurrently urged upwardly against the inflated sealing ring 62, with which it remains in pressure-tight sealing contact, and forces the sealing means 55, including the sealing ring 62 and its associated annular carrier, upwardly until the sealing means becomes positioned in its inner alternative location within the access opening 41, as shown in FIG. 15, where the threads or lugs on the filling opening portion 44 of the container are caused to threadably engage the threads or lugs within the rotating closure 120. The extent to which the closure is tightened on the filling opening portion of the container is controllable since it is subject to the extent of the upward pressure applied by the filling opening portion against the closure when the pedestal is elevated. For example, the more extensive the pressure, the greater will be the frictional gripping action of the soft rubber or rubber-like friction drive member 98 upon the closure. As a consequence, the upward stroke of the pedestal may be adjusted to develop the desired degree of rotational torque necessary to effect a pressure-tight attachment of the closure on the container.

Following the pressure-tight capping of the container, the chamber 29 is depressurized, preferably almost immediately to reduce the time cycle, by deflating the sealing ring 62. This is accomplished by communicating its interior with the atmosphere. The collar 58 falls to its lower position and is urged in that direction by springs 65. The pedestal 26 with the filled and capped container thereon is lowered to its original position indicated in FIG. 1. When so lowered, the filled and capped container may be transferred from the pedestal and replaced with an empty container for commencement of the next succeeding cycle because the control plate is, of course, already in position to receive another closure preparatory to initiation of the next filling and capping cycle.

It should be apparent from the foregoing description that numerous modifications may be made in the apparatus and the manner of its operation and utilization without departing from the spirit of the invention. For example, it should be appreciated that the capping means may be readily utilized in conjunction with a side-seal type of press-fit hermetic closure as well as with a lug-type or threaded-type closure. In the event a press-fit type of closure is to be utilized, the capping means would not need to be rotated. Additionally, in instances where the liquid-containing product is such that sterile pressurization of the chamber is unnecessary, the pressure supply conduit 33 may be closed by use of a suitable valve interposed in the conduit between the chamber and the source of supply of the sterile pressurizing media. Also, in this latter respect, it may be desirable with some types of liquid-containing products to refrain from inflating the sealing ring so as to permit the sterile pressure supply media to effect a purging action without pressurization of the chamber.

It should also be appreciated that the sterile pressure supply media may well be an inert gaseous media such as nitrogen, or the like, particularly where it is desirable that the flowable liquid-containing product should not be exposed to heat or moisture such as accompanies the use of pressurized steam. A typical example of a flowable liquid-containing product of the type in which an inert gaseous media other than steam might be preferable would be a liquid-containing product such as shaving cream, or the like, having a gas evolving substance included in the product so that the product may be dispensed under pressure from a conventional push-button type of dispenser.

Accordingly, the apparatus of the present invention, while being particularly well-suited for difficult packaging procedures involving the packaging of food products requiring exposure to a sterile, pressurized environment throughout the container filling and capping operations, is also well-suited for packaging many other types of flowable liquid-containing products where it is desirable to effect the entire filling and capping operations in a minimum amount of work space and with a minimum amount of movement of the container being necessitated.

In the foregoing description of the apparatus of the present invention, and as shown in the drawings, the shiftable control means including the transfer or control plate 68, the tubular sleeve 70 and the driven shaft 90 are mounted so that the shiftable control means cannot be raised or lowered. The reason for this is the manner in which the driven shaft 90 is rotated by the gears 112 and 113 with the gear 112 being mounted for rotation about a fixed horizontal axis. In the apparatus of my copending patent application Ser. No. 285,619 filed June 5, 1963, now abandoned, and entitled "Sterile Food Packaging Operation," there is utilized a closure support which has an upper extension that is mounted for vertical movement during part of the cycle of operation of the apparatus. The apparatus of that copending application does not provide for means to rotate the closure support about a vertical axis coincident with the center of the closure, whereas the apparatus of the present invention does provide such means. However, it is within the scope of the present invention to utilize the rotatable and shiftable closure support means of the present invention in a filling chamber or head as constructed in accordance with the invention of said copending patent application and in such case the drive mechanism for the closure support would utilize a conventional splined drive for the rotation of the shaft 90, whereby the closure support could be raised with the filling head and the container to be filled to place thereby a conduit or pipe in the passage of the roof of the filling head down into the container at the start of the filling operation with subsequent lowering of the container, the filling head and the closure support. Of course, this modification of one aspect of the present invention the plate 68 will not be used to close product supply conduit 36. Instead, a valve can be used in the conduit for this purpose. However, the top surface 69 of the plate 68 will have the arcuate groove which serves along with passages in the roof of the filling head to provide automatic control of purging gas and later pressurizing gas, as set forth above. However, if such is not desired, valved gas inlets can be located through the wall and roof of the head to communicate with the chamber regardless of the position of the plate 68.

After filling the container to the extent desired, the filling head, the closure support and the container support would be lowered in unison, followed by a shifting of the closure support by means of shifting the control plate to the position where the closure is in alignment with the bottle. Then the container support is raised until the container abuts the rotating closure and, of course, during the lifting the annular carrier 55 with its annular base plate 56, which can be considered as a sleeve or a hollow piston, is raised by the container. The closure is prevented from being lifted, because the plate 68 abuts the roof of the filling head 28. Furthermore, in the apparatus the means for lifting the filling head can operate without raising the plate 68 when it abuts the discharge end of the product supply conduit 36 to dispose the closure support below the carrier 55 to pick up another screw closure. In this instance, obviously, the plate 68 must be small enough and the sleeve 70 and the shaft 90 must be suitably located, i.e., slightly different to that shown, for example, in FIG. 9.

The method of the present invention for packaging a flowable liquid-containing product in a container can be stated as the following series of steps:

(1) Supporting a sleeve or hollow piston at an elevation at which the piston is partially inserted in shiftable and hermetically sealing relationship in a cylindrical bottom opening of a filling chamber;

(2) Inserting a closure for a container up through the hollow piston until entirely within the chamber and spaced from the hollow piston but in axial alignment with the piston;

(3) Supporting the closure in the filling chamber;

(4) Raising a container having a top part, including an open upper end, through the hollow piston until at least the open end of the container is in the filling chamber and spaced from the closure and the piston;

(5) Introducing gas into the chamber at the top of the chamber to purge at least some air from the container by passing through the space between the container and the piston to the atmosphere;

(6) Closing the space between the piston and the container to close the bottom opening of the filling chamber to provide a hermetically-sealed closed filling chamber and to cause the piston to be movable above its supported elevation upon any lifting of the container;

(7) Introducing pressurized gas into the chamber through a gas inlet to provide an elevated gaseous pressure within the closed filling chamber by communicating the gas inlet with a source of pressurized gas;

(8) Moving the closure laterally in an arcuate path until out of the product flow zone of the pressurized closed filling chamber;

(9) Introducing flowable product into the pressurized closed filling chamber and then into the container through a different inlet in the chamber and in alignment with at least part of the open end of the container until the container is filled with the product to the desired extent while maintaining communication between the gas inlet and the source of pressurized gas and while maintaining the piston at its initially-supported elevation;

(10) Ceasing the introduction of flowable product through the different inlet;

(11) Returning the closure through the arcuate path until again in axial alignment with the hollow piston while closing the gas inlet;

(12) Rotating the closure while continuing to support the closure for its maintenance at a fixed elevation;

(13) Lifting the container and thereby raising the piston until the closure abuts the top part of the container;

(14) Continuing the rotation and support of the closure while continuing to raise the container and thereby the piston, whereby the closure is applied to the container in hermetically sealing relationship;

(15) Opening the space between the hollow piston and sealed container to release elevated gaseous pressure in the chamber and to release the piston from its support by the container, whereby the piston moves to its lower initially-supported elevation; and (16) Lowering the sealed container until the container is completely outside the chamber and outside the hollow piston.

When the method is used to package flowable aqueous-containing product, such as baby food formula, at a sterilizing temperature, which may be lower than the actual temperature used for sterilization, steam is preferably used as the purging gas. Steam is also used to provide an elevated gaseous pressure in the closed chamber, prior to and during the flow of product introduced into the container via the chamber. The steam pressure at least equals the vapor pressure of the water at the temperature at which the product is introduced. The product during actual sterilization and thereafter, but before introduction into the chamber, is maintained under a pressure at least equal to the vapor pressure of the water in the product to prevent boiling of the product.

Thus, although the apparatus of the present invention has been described in substantial detail, it is not intended that the invention herein be limited to such detail or otherwise restricted in any extent other than may be necessitated by the scope of the appended claims.

I claim:
1. A method for packaging a flowable liquid-containing product in a container, which comprises:
  (1) supporting a hollow piston at an elevation at which the piston is partially inserted in shiftable and hermetically sealing relationship in a cylindrical bottom opening of a filling chamber;
  (2) inserting a closure for a container up through the hollow piston until entirely within the chamber and spaced from the hollow piston but in axial alignment with the piston;
  (3) supporting the closure in the filling chamber;
  (4) raising a container having a top part, including an open upper end, through the hollow piston until at least the open end of the container is in the filling chamber and spaced from the closure and the piston;

(5) introducing gas into the chamber at the top of the chamber to purge at least some air from the container by passing through the space between the container and the piston to the atmosphere;

(6) closing the space between the piston and the container to close the bottom opening of the filling chamber to provide a hermetically-sealed closed filling chamber and to cause the piston to be movable above its supported elevation upon any lifting of the container;

(7) introducing pressurized gas into the chamber through a gas inlet to provide an elevated gaseous pressure within the closed filling chamber by communicating the gas inlet with a source of pressurized gas;

(8) moving the closure laterally in an arcuate path until out of the product flow zone of the pressurized closed filling chamber;

(9) introducing flowable product into the pressurized closed filling chamber and then into the container through a different inlet in the chamber and in alignment with at least part of the open end of the container until the container is filled with the product to the desired extent while maintaining communication between the gas inlet and the source of pressurized gas and while maintaining the piston at its initially-supported elevation;

(10) ceasing the introduction of flowable product through the different inlet;

(11) returning the closure through the arcuate path until again in axial alignment with the hollow piston while closing the gas inlet;

(12) rotating the closure while continuing to support the closure for its maintenance at a fixed elevation;

(13) lifting the container and thereby raising the piston until the closure abuts the top part of the container;

(14) continuing the rotation and support of the closure while continuing to raise the container and thereby the piston, whereby the closure is applied to the container in hermetically sealing relationship;

(15) opening the space between the hollow piston and sealed container to release elevated gaseous pressure in the chamber and to release the piston from its support by the container, whereby the piston moves to its lower initially-supported elevation; and (16) lowering the sealed container until the container is completely outside the chamber and outside the hollow piston.

2. The method of claim 1 in which:

(1) the product is baby food formula and is introduced into the chamber at a sterilizing temperature and under a pressure at least equal to the vapor pressure of water in the food formula at said sterilizing temperature;

(2) the purging gas is steam; and (3) the pressurized gas is steam and provides the closed chamber with a gas pressure at least equal to the vapor pressure of water in the food formula at the temperature of introduction of the food formula into the closed chamber and into the container.

3. An apparatus for packaging a flowable liquid containing a product in a container, which comprises:

(1) a support structure;

(2) a filling head mounted on said support structure, said filling head having:

(a) a roof having at least a flat bottom surface portion;

(b) sidewalls;

(c) a bottom wall;

(d) a cylindrical access opening in said bottom wall;

(e) an aperture in the roof at said flat portion;

(f) a gas inlet; and (g) a different inlet in said roof to introduce the product, said roof, sidewalls and bottom wall defining an interior chamber;

(3) means to support a closure for application to the container, said closure support means including:

(a) a plate having a portion with a flat top surface and another portion with a cylindrical extension, said cylindrical extension passing through said aperture in hermetically sealing relationship with said roof and said portion with the flat top surface being within said filling head and facing said flat bottom surface of said roof;

(b) a closure support below and supported by said plate;

(c) means to shiftably support said plate about the longitudinal axis of said cylindrical extension; and (d) means to shift said plate in an arcuate path about said axis between a position to present a closure supported by said closure support in alignment with said cylindrical access opening and a position out of the path of travel of the product through said different inlet, part of said flat surface portion of said roof having an area to be directly above said flat surface portion of said plate at all times;

(4) conduit means connected to said gas inlet of said filling head in hermetically sealing relationship with said head and having a discharge opening in communication with said interior chamber of said head to introduce gas into said chamber;

(5) means to selectively close and open said gas-introducing means;

(6) conduit means connected to said different inlet of said filling head with said head in hermetically sealing relationship and having a discharge opening at a fixed elevation in communication with said interior chamber of said head to introduce said product into the container;

(7) means to selectively close and open said product-introducing conduit means;

(8) a hollow piston slidably positioned in said cylindrical access opening in hermetically sealing relationship with said bottom wall;

(9) means to support said slidable hollow piston in said access opening at a lower position of said piston;

(10) means mounted on the interior wall of said piston to engage a container at least partially in said piston to provide a hermetical seal between the container and said piston to hermetically close said access opening;

(11) a support for a container; and (12) means to raise and lower said container support whereby said container support is alternatively at:

(a) a bottom position at which the container can be moved laterally onto and off said container support;

(b) an intermediate position at which at least the open end of the container in upstanding position on said container support is in said hollow piston at its lower position and at which said container-engaging means can engage the container; and (c) an upper position at which the container-sealing means can seal the container on said container support.

4. The apparatus of claim 3 wherein said plate support means is mounted on said support structure to place said portion with a flat top surface of said plate in abutment with said flat surface portion of said roof of said filling head.

5. The apparatus of claim 3 wherein said container-engaging means mounted on the interior wall of said piston is an inflatable resilient tubular ring, said apparatus further including valved conduit means connected to said inflatable ring, to sequentially inflate and deflate said ring.

6. The apparatus of claim 3 wherein said gas inlet is in said roof and wherein said plate of said closure support means has in its top portion an arcuate groove in said portion with a flat top surface of said plate, said groove and said gas inlet being radially equidistant from said longitudinal axis of said cylindrical extension of said plate, said apparatus further including:
(1) a first hole in said roof and extending only from the bottom surface of said roof, said first hole also being equidistant from said longitudinal axis and with the distance between said hole and said gas inlet in an arcuate path being less than the entire arcuate length of said groove;
(2) a passageway in the filling head and at one end communicating with said first hole; and
(3) a second hole in the filling head out of the path of travel of said plate at one end and communicating with said passageway at its other end, whereby gas entering said gas inlet must pass through said groove, said first hole, said passageway and said second hole to reach said interior chamber of said filling head and whereby said plate in one part of its arcuate path of swinging said groove out of communication with said gas inlet remains in abutment with said roof at said inlet.

7. The apparatus of claim 6 wherein said second hole is at least in part in said roof of said filling chamber and said passageway is entirely in said roof.

8. The apparatus of claim 6 wherein said second hole is in at least in part in a sidewall of said filling head and communications with said interior chamber below and adjacent to said closure support means when said plate and said closure support are at said position out of the path of travel of food product through said different inlet, and said passageway is partly in said roof and partly in said sidewall.

9. The apparatus of claim 6 and further including:
(1) a second passageway in said filling head, said second passage being entirely in said roof; and
(2) a pair of holes in said roof extending from said flat surface portion to communicate said second passageway with said interior chamber of said filling head, one hole of said pair being also equidistant from said longitudinal axis and on the arcuate side of said gas inlet opposite to said first hole to communicate with said gas inlet through said groove only during an intermediate part of shifting of said plate from said position in alignment with said access opening to said position out of the path of travel of the product and said other hole being located out of the path of travel of said groove during movement of said plate between said positions.

10. The apparatus of claim 3 wherein said cylindrical extension is tubular and further including:
(1) a shaft;
(2) means outside said filling head to rotate said shaft; and
(3) means mounted on said shaft below said plate to rotate said closure support.

11. The apparatus of claim 10 wherein said means to rotate said closure support includes:
(1) a driving gear mounted on said shaft to rotate said shaft; and
(2) a driven gear below and mounted on said plate for rotation about a vertical axis, said closure support mounted on and below said driven gear to rotate with said driven gear, and said closure support including:
(a) a cylindrical housing having a side wall and a base plate and mounted on said driven gear by said base plate;
(b) a cylindrical magnet within said housing; and
(c) an annular member of rubber frictionally engaging said housing and said magnet to provide rotation in unison by said housing annular member and magnet.

12. The apparatus of claim 3 wherein said hollow piston has on its bottom a flange extending radially outward and wherein said piston is supported by bolts extending upwardly through said flange and secured into said filling head to permit vertical movement of said piston and to limit the maximum downward travel thereof.

13. The apparatus of claim 3 and further including means to resiliently resist upward movement of said hollow piston.

14. The apparatus of claim 3 wherein said cylindrical extension is tubular and further including:
(1) a shaft;
(2) means outside said filling head to rotate said shaft; and
(3) means mounted on said shaft below said plate to rotate said closure support.

15. The apparatus of claim 14 wherein said means to rotate said closure support includes:
(1) a driving gear mounted on said shaft to rotate said shaft; and
(2) a driven gear below and mounted on said plate for rotation about a vertical axis, said closure support being mounted on and below said driven gear to rotate with said driven gear, said closure support including:
(a) a cylindrical housing having a side wall and a base plate and mounted on said driven gear by said base plate;
(b) a cylindrical magnet within said housing; and
(c) an annular member of rubber frictionally engaging said housing and said magnet to provide concurrent rotation of said housing, said annular member and said magnet.

16. The appartus of claim 3 wherein said plate support means is mounted on said support structure to place said portion with a flat top surface of said plate in abutment with said flat surface portion of said roof of said filling head.

17. The apparatus of claim 3 wherein said container-engaging means mounted on the interior wall of said piston is an inflatable resilient tubular ring, said apparatus further including valved conduit means connected to said inflatable ring, to sequentially inflate and deflate said ring.

18. The apparatus of claim 3 wherein said gas inlet is in said roof and wherein said plate of said closure support means has in its top portion an arcuate groove in said portion with a flat top surface of said plate, said groove and said gas inlet being radially equidistant from said longitudinal axis of said cylindrical extension of said plate, said apparatus further including:
(1) a first hole in said roof and extending only from the bottom surface of said roof, said first hole also being equidistant from said longitudinal axis and with the distance between said hole and said gas inlet in an arcuate path being less than the entire arcuate length of said groove;
(2) a passageway in the filling head and at one end communicating with said first hole; and
(3) a second hole in said filling head out of the path of travel of said plate at one end and communicating with said passageway at its other end, whereby gas entering said gas inlet must pass through said groove, said first hole, said passageway and said second hole to reach said interior chamber of said filling head and whereby said plate in one part of its arcuate path of swinging has said groove out of communication with said gas inlet but said plate remains in abutment with said roof at said inlet.

19. The apparatus of claim 15 wherein said different inlet for the product is in the roof in the path of arcuate travel of said flat top surface portion of said plate.

20. An apparatus for packaging liquid-containing product, which comprises:
(1) a support structure;
(2) a filling head monuted on said support structure having:
 (a) a roof having a portion of its bottom surface as a flat surface;
 (b) sidewalls;
 (c) a bottom wall, said roof, sidewalls and bottom wall defining an interior chamber;
 (d) an access opening in said head below said roof to introduce into said interior chamber a container to be filled with the product and sealed;
 (e) a gas inlet in said roof;
 (f) a different inlet for the product;
 (g) an aperture in said roof;
 (h) a hole in said roof extending from the bottom surface of said roof;
 (i) a passageway at least extending horizontally in said roof and communicating adjacent one end with said hole; and
 (j) a second hole in the inner surface of said filling head and communicating with said passageway;
(3) closure support means including:
 (a) a plate having an upper surface portion as a flat surface and an arcuate groove of limited length in said portion and having an upper cylindrical extension through said aperture;
 (b) means to support said plate; and
 (c) means to shift said plate about the l ngitudinal axis of said cylindrical extension;
(4) means to introduce and support a container at least partially through said access opening;
(5) means to close and open said access opening;
(6) conduit means to introduce the product into said different inlet;
(7) means to close and open said product-introducing conduit means; and
(8) conduit means to introduce gas through said gas inlet, said plate-support means positioning said flat top surface of said plate in abutment with said flat bottom surface of said roof, whereby in one position of said plate in alignment with a container capping zone said plate closes communication between said gas inlet and said holes due to the insufficient length of said groove to span the arcuate distance between said gas inlet and said hole in said roof, said gas inlet, said hole and said groove each being equidistant from said longitudinal axis of said cylindrical extension, and whereby in another position of said plate out of the path of flow of product into the container, said groove intercommunicates with inlet and said holes to introduce gas into the interior chamber through said groove and said passageway.

21. The apparatus of claim 20 wherein the passageway is at least partly in said roof and said second hole is at least partly in said roof.

22. The apparatus of claim 20 wherein the passageway is partly in the roof and partly in said sidewall and said second hole extends into said side wall to a location below said closure support means and adjacent a zone of the chamber occupied by said shiftable plate during flow of product into the container.

23. The apparatus of claim 20 and further including:
(1) a second hole in the bottom surface of said roof on the opposite side of said gas inlet;
(2) a second passageway in said roof; and
(3) a third hole in the bottom surface of said roof, said second and third holes intercommunicating by said second passage, said gas inlet and second hole intercommunicating by said groove during part of said plate.

References Cited
UNITED STATES PATENTS

| | | | |
|---|---|---|---|
| 2,695,743 | 11/1954 | Wetherby-Williams | 53—112 |
| 2,874,523 | 2/1959 | Ryan | 53—22 |
| 2,931,150 | 4/1960 | Ryan | 53—112 |
| 2,972,214 | 2/1961 | Juin | 53—37 |
| 3,169,355 | 2/1965 | Hollaway et al. | 53—88 |

RAYMOND N. JONES, *Primary Examiner.*

S. B. DAVIS, *Assistant Examiner.*

U.S. Cl. X.R.

99—183; 53—85, 112; 141—85, 287

U.S. DEPARTMENT OF COMMERCE
PATENT OFFICE
Washington, D.C. 20231

UNITED STATES PATENT OFFICE
CERTIFICATE OF CORRECTION

Patent No. 3,438,790             April 15, 1969

Herbert A. Barnby, deceased, by
Bernice P. Barnby, Executrix

It is certified that error appears in the above identified patent and that said Letters Patent are hereby corrected as shown below:

Column 1, line 37, "most" should read -- more --; line 58, "process" should read -- possess --. Column 7, line 48, "atachment" should read -- attachment --; line 66, "ad" should read -- and --. Column 11, line 2, "the", third occurrence, should be canceled. Column 12, line 7, "sotf" should read -- soft --. Column 17, line 32, "in", first occurrence, should be canceled; line 33, "communications" should read -- communicates --. Column 19, lines 31 and 32, "l ngitudinal" should read -- longitudinal --. Column 20, line 9, after "with" insert -- gas --; line 28, after "of" insert -- the shift of --.

Signed and sealed this 2nd day of June 1970.

(SEAL)
Attest:

Edward M. Fletcher, Jr.
Attesting Officer

WILLIAM E. SCHUYLER, JR
Commissioner of Patents